(12) United States Patent
Petrovic et al.

(10) Patent No.: US 8,992,794 B2
(45) Date of Patent: Mar. 31, 2015

(54) PROCESS FOR SYNTHESIS OF A LAYERED OXIDE CATHODE COMPOSITION

(75) Inventors: Ivan Petrovic, Princeton, NJ (US); Anthony Thurston, Macedonia, OH (US); Stephen Sheargold, Solon, OH (US)

(73) Assignee: BASF Corporation, Florham Park, NJ (US)

( * ) Notice: Subject to any disclaimer, the term of this patent is extended or adjusted under 35 U.S.C. 154(b) by 361 days.

(21) Appl. No.: 13/168,516

(22) Filed: Jun. 24, 2011

(65) Prior Publication Data

US 2012/0326077 A1    Dec. 27, 2012

(51) Int. Cl.
| | |
|---|---|
| *H01M 4/88* | (2006.01) |
| *C01G 45/12* | (2006.01) |
| *H01M 4/131* | (2010.01) |
| *H01M 4/1391* | (2010.01) |
| *H01M 4/505* | (2010.01) |
| *H01M 4/525* | (2010.01) |
| *C01G 51/00* | (2006.01) |
| *C01G 53/00* | (2006.01) |

(52) U.S. Cl.
CPC ........... *C01G 45/1221* (2013.01); *H01M 4/131* (2013.01); *H01M 4/1391* (2013.01); *H01M 4/505* (2013.01); *H01M 4/525* (2013.01); *Y02E 60/122* (2013.01); *C01G 45/1228* (2013.01); *C01G 51/44* (2013.01); *C01G 51/50* (2013.01); *C01G 53/44* (2013.01); *C01G 53/50* (2013.01); *C01P 2002/72* (2013.01); *C01P 2006/40* (2013.01)
USPC ............ 252/182.1; 423/599; 423/594.3; 423/593.1; 423/594.4; 423/468

(58) Field of Classification Search
CPC ... H01M 4/131; H01M 4/139; H01M 4/1391; H01M 4/48; H01M 4/505; H01M 4/525; H01M 4/88
USPC ............... 252/182.1; 423/599, 594.3, 593.1, 423/594.4, 463
See application file for complete search history.

(56) References Cited

U.S. PATENT DOCUMENTS

| | | | |
|---|---|---|---|
| 5,728,367 A | | 3/1998 | Mao |
| 5,874,058 A | * | 2/1999 | Sheargold et al. ............. 423/599 |
| 5,908,291 A | * | 6/1999 | Dover et al. ................... 432/107 |
| 6,004,526 A | | 12/1999 | Sugimoto et al. |
| 6,267,943 B1 | * | 7/2001 | Manev et al. .................. 423/599 |
| 6,350,543 B2 | | 2/2002 | Yang et al. |
| 7,211,237 B2 | * | 5/2007 | Eberman et al. ......... 423/594.15 |
| 7,381,496 B2 | * | 6/2008 | Onnerud et al. ............ 429/231.1 |
| 2001/0051384 A1 | | 12/2001 | Bates |
| 2009/0289218 A1 | | 11/2009 | Kajiya et al. |

(Continued)

FOREIGN PATENT DOCUMENTS

WO     2011072397 A1    6/2011

OTHER PUBLICATIONS

International Search Report published Feb. 21, 2013 for PCT/US2012/043479 filed Jun. 21, 2012.

(Continued)

*Primary Examiner* — Jane L Stanley
(74) *Attorney, Agent, or Firm* — Ivan Petrovic; Anthony Thurston; Stephen Sheargold

(57) ABSTRACT

A method for preparing a layered oxide cathode using a two step calcination procedure, wherein the first step includes pre-calcination utilizing a rotary calciner.

26 Claims, 4 Drawing Sheets

(56) References Cited

U.S. PATENT DOCUMENTS

2009/0299922 A1* 12/2009 Malcus et al. ............... 705/500
2011/0315938 A1* 12/2011 Schroedle et al. ....... 252/519.15

OTHER PUBLICATIONS

International Preliminary Report on Patentability issued Dec. 24, 2013 for PCT/US2012/043479 filed Jun. 21, 2012.

* cited by examiner

PROCESS FOR SYNTHESIS OF A LAYERED OXIDE CATHODE COMPOSITION

GOVERNMENT SUPPORT

The U.S. Government has a nonexclusive nontransferable irrevocable paid-up license in this application throughout the world under the terms of DE-EE0000563 awarded by the U.S. Department of Energy and per 48 CFR 952.227-13(k).

BACKGROUND

Lithium-ion batteries are composed of three components—an anode, a cathode, and an electrolyte that allows Li ions to flow from the anode to the cathode (discharging), or vice versa (charging). There are many known cathode materials, including, for example, $LiCoO_2$, $LiMn_2O_4$, $LiNiO_2$, $LiFePO_4$, $Li_2FePO_4F$, $Li(Ni_{1/3}Co_{1/3}Mn_{1/3})O_2$, and $Li(Li_aNi_xCo_yMn_z)O_2$.

Although these cathode materials are well known, syntheses of these cathodes can be costly and time consuming. For example, synthesis of a layered oxide cathode material, such as $Li(Li_aNi_xCo_yMn_z)O_2$, wherein lithium carbonate is the Li source, requires calcination at greater than 700° C. for 20 to 30 hours in a ceramic saggar in either a box type furnace, a pusher type tunnel kiln, or a roller hearth kiln (RHK). In certain instances, these materials can require double pass calcination with a milling step required between the first and second calcinations to ensure complete reaction of the starting materials and good product homogeneity.

In view of the attendant costs associated with long calcination times for the production of layered oxide cathodes, it would be desirable to develop a process that operated at lower temperature, required less calcination time, or both.

SUMMARY

The present disclosure provides a process for the synthesis of a layered oxide cathode composition for use in secondary Li-ion batteries. The process comprises two steps: a) pre-calcination of a "green" mixture at temperature of up to about 750° C. in a rotary calciner; and b) high temperature calcination of the pre-calcined material at a temperature of at least about 750° C.

An embodiment includes a process for preparing a layered oxide cathode composition, said process comprising: pre-calcining a lithium source and a mixed metal precursor in a first rotary calciner to form a pre-calcined material; and subjecting said pre-calcined material to high temperature calcination in a second rotary calciner at a temperature of at least about 750° C. In an embodiment, the lithium source is selected from the group consisting of lithium carbonate, lithium hydroxide, lithium oxide, lithium chloride, lithium nitrate, lithium sulfate, lithium hydrogen-carbonate, lithium acetate, lithium fluoride, lithium bromide, lithium iodide, and lithium peroxide. In an embodiment, the mixed metal precursor is selected from the group consisting of mixed metal hydroxides, metal oxy-hydroxides, metal carbonates, and metal hydroxyl-carbonates. In an embodiment, first and second rotary calciners each individually has at least two zones. In an embodiment, the pre-calcination step and the high temperature calcination step each individually takes place for less than 12 hours. In an embodiment, the pre-calcination step and the high temperature calcination step each individually takes place for less than 6 hours. In an embodiment, the pre-calcination step and the high temperature calcination step each individually takes place for less than 2 hours. In an embodiment, said each of said zones has a same or a different temperature from each other zone. In an embodiment, the mixed metal precursor comprises nickel manganese cobalt and aluminum, in a ratio of $Ni_xMn_yCo_zAl_w$, where $x+y+z+w \leq 1$, and $0 \leq x < 1$, $0 \leq y < 1$, $0 \leq z < 1$ and $0 \leq w < 0.2$. In an embodiment, the high temperature calcination comprises: heating said pre-calcined material to a temperature of at least about 750° C. over a first period of time; and holding said temperature for a second period of time. In an embodiment, the temperature is at least about 900° C. In an embodiment, the first period of time is about 1 hour or less, and said second period of time is about 3 hours or less. In an embodiment, the first and second rotary calciner each individually comprises a metallic tube or a ceramic tube. In an embodiment, the pre-calcining and high-temperature calcining steps have an aggregate duration of about 15 hours or less.

An embodiment of the process includes a process for preparing a layered oxide cathode composition, said process comprising: pre-calcining a lithium source and a mixed metal precursor in a rotary calciner to form a pre-calcined material; and subjecting said pre-calcined material to high temperature calcination in a box type furnace at a temperature of at least about 750° C. In an embodiment, the lithium source is selected from the group consisting of lithium carbonate, lithium hydroxide, lithium chloride, lithium oxide, lithium nitrate, lithium sulfate, lithium hydrogen-carbonate, lithium acetate, lithium fluoride, lithium bromide, lithium iodide, and lithium peroxide. In an embodiment, the mixed metal precursor is selected from the group consisting of mixed metal hydroxides, metal oxy-hydroxides, metal carbonates and metal hydroxy-carbonates. In an embodiment, the rotary calciner has at least two zones. In an embodiment, the pre-calcination step and the high temperature calcination step each individually takes place for less than 12 hours. In an embodiment, the pre-calcination step takes place for less than 4 hours and the high temperature calcination step takes place for less than 8 hours. In an embodiment, each of said zones is a same or a different temperatures from each other zone. In an embodiment, said mixed metal precursor comprises nickel manganese cobalt and aluminum, in a ratio of $Ni_xMn_yCo_zAl_w$, where $x+y+z+w \leq 1$, and $0 \leq x < 1$, $0 \leq y < 1$, $0 \leq z < 1$ and $0 \leq w < 0.2$. In an embodiment, said high temperature calcination comprises: heating said pre-calcined material to a temperature of at least about 750° C. over a first period of time; and holding said temperature for a second period of time.

BRIEF DESCRIPTION OF THE DRAWINGS

The foregoing summary, as well as the following detailed description of the embodiments, will be better understood when read in conjunction with the appended drawings. For the purpose of illustration, there are shown in the drawings some embodiments which may be preferable. It should be understood, however, that the embodiments depicted are not limited to the precise arrangements and instrumentalities shown.

DETAILED DESCRIPTION

Figure 1:
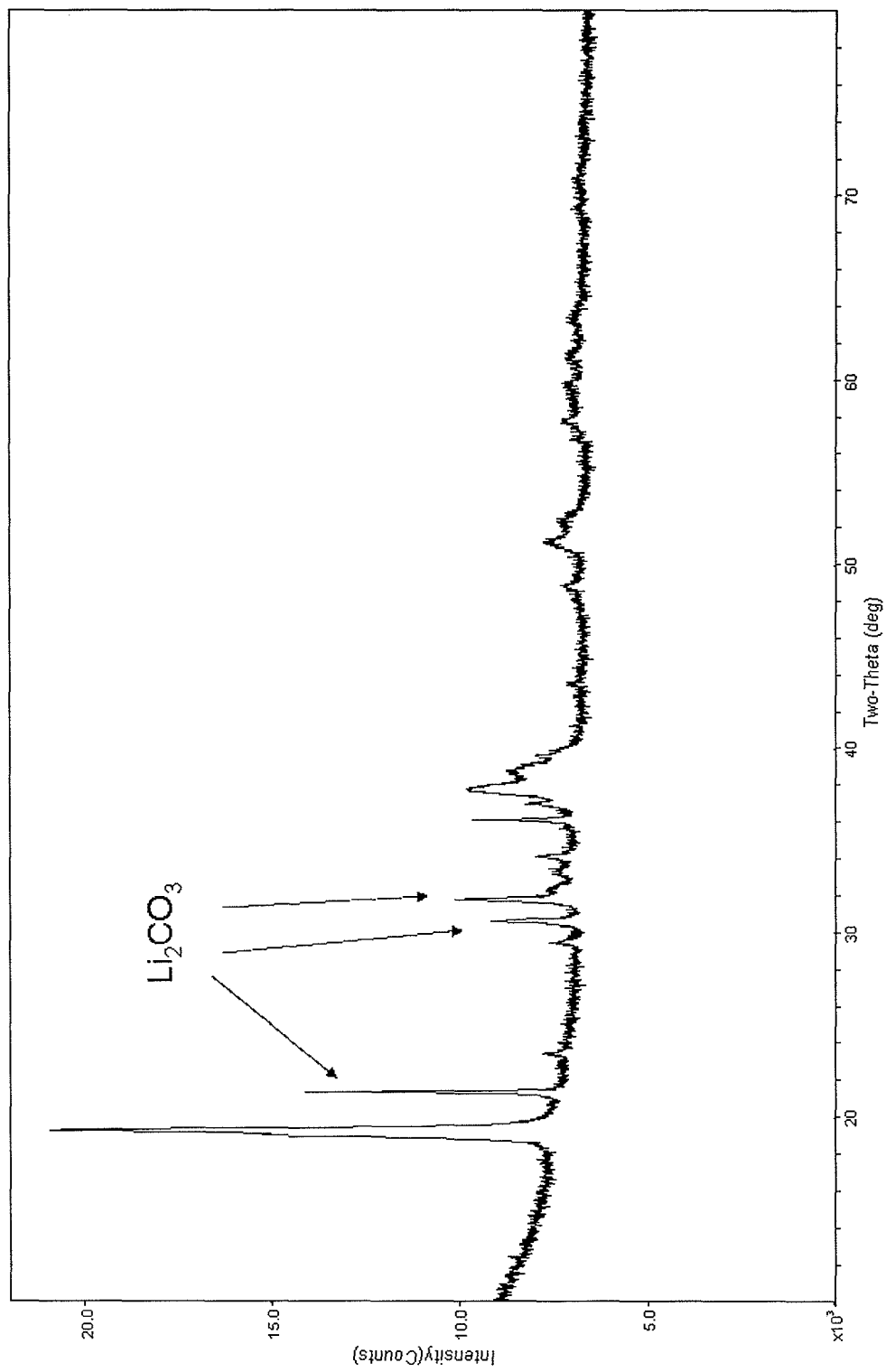
FIG. 1 is a powder x-ray diffraction pattern of the green mixture.

The present disclosure provides a process for the synthesis of a layered oxide cathode composition for use in secondary Li-ion batteries. In an embodiment, the process comprises two steps: a) pre-calcination of a "green" mixture in a rotary calciner at temperature up to about 750° C. to obtain a pre-calcined intermediate; and b) high temperature calcination of the pre-calcined intermediate at a temperature of above about 750° C. in a rotary calciner. In an embodiment, the process comprises two steps: a) pre-calcination of a "green" mixture in a rotary calciner at temperature up to about 750° C. to obtain a pre-calcined intermediate; and b) high temperature calcination of the pre-calcined intermediate at a temperature of above about 750° C. in a box type furnace. In an embodiment, the green mixture comprises one or more mixed metal precursors and a lithium source.

One example of a suitable mixed metal precursor is a mixed metal oxy-hydroxide, such as $Ni_{1/3}Co_{1/3}Mn_{1/3}O_x(OH)_y$, which is commercially available as "X01" from OM Group, Inc. ("OMG"). Other examples of suitable mixed metal precursors include, but are not limited to, metal hydroxides, metal oxy-hydroxides, metal carbonates, and metal hydroxyl-carbonates. Suitable sources of lithium include, but are not limited to, lithium carbonate ($Li_2CO_3$), as well as lithium hydroxide, lithium oxide, lithium chloride, lithium nitrate, lithium sulfate, lithium hydrogen-carbonate, lithium acetate, lithium fluoride, lithium bromide, lithium iodide, and lithium peroxide. In particular embodiments, the lithium source can be lithium carbonate.

In an embodiment, the mixed metal precursor and the lithium source can be mixed such that the molar ratio of lithium to metal can be from about 0.5 to about 2.0, and in other embodiments, from about 0.75 to about 1.5. In particular embodiments, the Li to metal ratio can be about 1.15. When calculating the Li to metal ratio, the molar quantity of metal is equal to the sum of the total moles of transition metals present. For example, in $Ni_{1/3}Co_{1/3}Mn_{1/3}O_x(OH)_y$, the moles of metal (assuming 1 mol of total material) is (1/3)*3, or 1. In order to achieve a Li/Metal ratio of 1.15, about 0.575 moles of $Li_2CO_3$ would be necessary.

In an embodiment, the green mixture can be formed by mixing the lithium and the mixed metal precursor. The green mixture can then pre-calcined in a rotary calciner. Unlike a typical box furnace or other continuous type calcination equipment, a rotary calciner induces mixing during the pre-calcining process and exposes the entirety of the green mixture to the atmosphere of the rotary calcining apparatus. The calcination atmosphere can be air, oxygen enriched air (i.e. air having an oxygen content of greater than about 21% by volume), pure oxygen, or other oxidizing atmosphere. It has been surprisingly found that this mixing step substantially reduces overall calcining time, as compared, for example, to calcinations using a roller hearth kiln or other furnace, wherein the green mixture is necessarily held in a static position for the duration of the calcination process. Without wishing to be bound by any particular theory, it is believed that greater exposure of the green mixture to the atmosphere of the rotary calciner enhances the reaction rate between the lithium source, mixed metal precursor, and the calcination atmosphere, such as oxygen.

The duration of the pre-calcination steps and/or high temperature calcination steps can each individually or in aggregate be less than about 12 hours, and in certain embodiments, less than about 6 hours, less than about 2 hours, or even less than about 1 hour. For example, in an embodiment, the pre-calcination step takes place in less than 12 hours and the high temperature calcination step takes place in less than 12 hours. In an embodiment, the pre-calcination steps and/or high temperature calcination steps can each individually or in aggregate be from about 15 minutes to about 12 hours, and in certain embodiments, from about 15 minutes to about 6 hours, from about 15 minutes to about 2 hours, or even from about 15 minutes to about 1 hour. In another embodiment, the pre-calcination step takes place in less than 4 hours and the high temperature calcination takes please for less than 8 hours. In another embodiment, the pre-calcination step takes place in from about 15 minutes to less than 4 hours and the high temperature calcination takes please for from about 15 minutes to less than 8 hours.

The pre-calcination can be performed at a temperature of at least about 750° C. In an embodiment, the pre-calcination step and high calcination step can take place in a first and second rotary calciner, wherein the first and second rotary calciner can be the same calciner or different calciners. In an embodiment, the pre-calcination step and the high temperature calcination step can each individually comprise more than one sub-step.

In an embodiment, a given rotary calciner can have one or more zones, including at least two zones. For example, in certain embodiments, the rotary calciner can have three to six zones or more. In particular embodiments, the rotary calciner can have three zones. The use of a zoned rotary calciner allows for maintenance of a temperature gradient, or alternatively, can be used to provide better temperature control when trying to maintain a constant temperature throughout the rotary calciner. In an embodiment, each zone can have the same or a different temperature from each other zone.

In an embodiment having three zones, the first zone can have a temperature ranging from about 195° C. to about 330° C., including all whole and partial increments there between. In particular embodiments, the temperature in the first zone can be about 200° C., 250° C., 300° C., or 325° C.

In particular embodiments, the second and third zones can have temperatures independently ranging from about 340° C. to about 750° C., including all whole and partial increments there between. In particular embodiments, the temperatures in the second and third zones can be, independently, about 350° C., 450° C., 500° C., 550° C., 580° C., 600° C., 650° C., 700° C. and 750° C. In particular embodiments, the second and third zones can have the same temperature.

Rotary pre-calcination can be performed in a rotary calciner having a ceramic or a metallic tube. It has been surprisingly found that using a rotary calciner having a metallic tube does not increase impurities such as Fe, Cr, Cu, or Zn in the pre-calcined intermediate. If present, impurities of this nature can impede the performance of the resulting layered oxide material. In an embodiment, a first and second calciner can each individually have a ceramic or a metallic tube.

Figure 2:
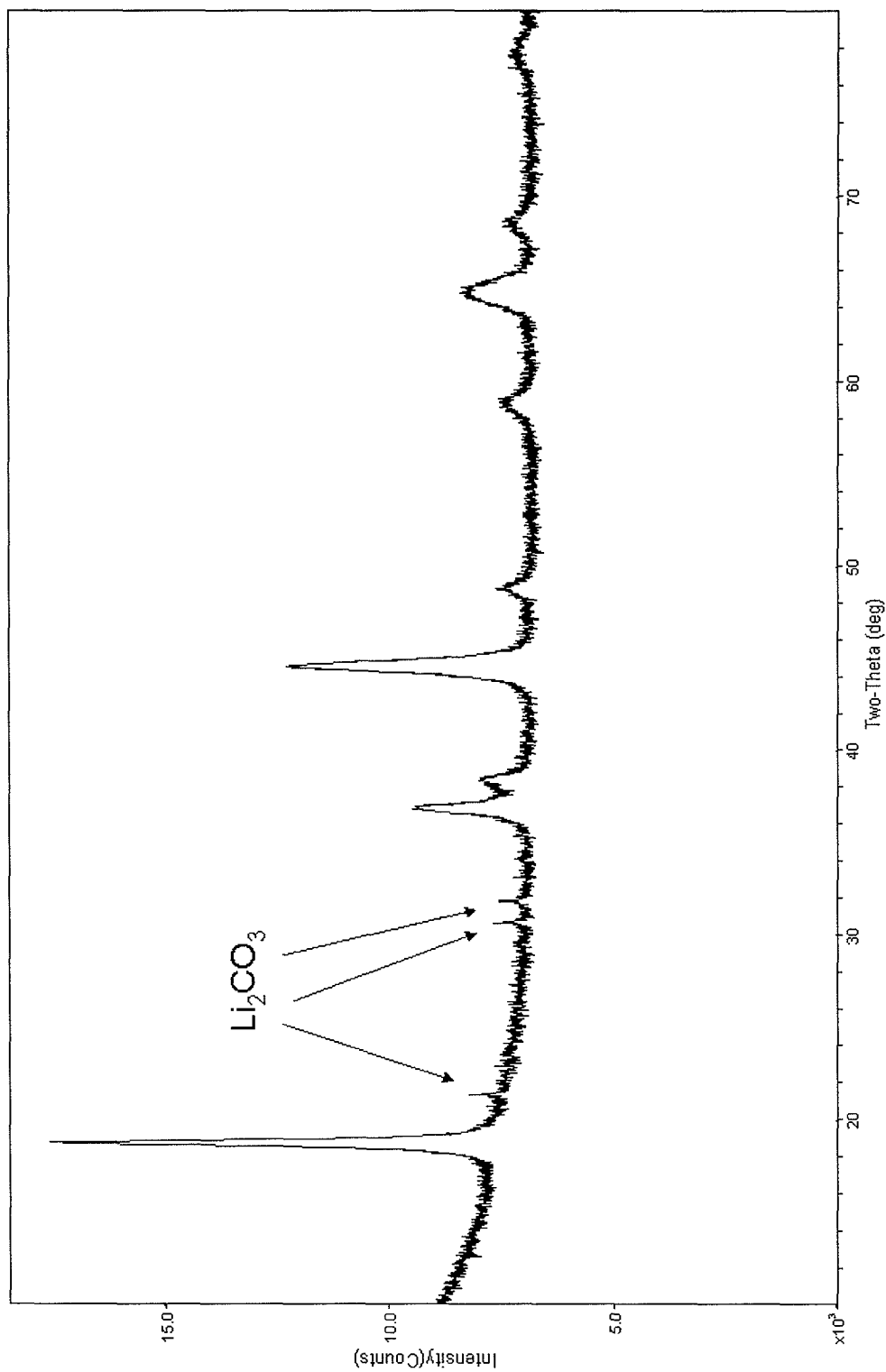
FIG. 2 is a powder x-ray diffraction pattern of the green mixture after 580° C. rotary pre-calcination in air.

When lithium carbonate is used as the lithium source, the intermediate obtained from the pre-calcination step can contain a small amount of residual lithium carbonate, as observed by powder x-ray diffraction ("XRD"). See, e.g., FIG. 2. Without wishing to be bound by any particular theory, it is believed that the reduction in residual lithium source, and particularly lithium carbonate, partial oxidation of transition metals and the formation of the intermediate results in an increase of up to about 60% in the tap density of the resultant powder after pre-calcination as compared to the green mixture before pre-calcination.

Powder XRD of the pre-calcined intermediate shows a microcrystalline layered structure closely resembling the powder XRD pattern of the final product. Despite the structural similarity, to realize optimal functionality in a rechargeable battery, the layered structure must be fully crystalline. Thus, following pre-calcination, the pre-calcined intermediate can be subject to high temperature calcination. High temperature calcination can be performed at a temperature above about 750° C. up to about 1000° C. in an atmosphere comprising air, oxygen enriched air, pure oxygen, ozone or other oxidizing atmosphere. In an embodiment, the high temperature calcination can comprise heating the pre-calcined material to a temperature of at least about 750° C. over a first period of time and holding the temperature for a second period of time. In particular embodiments, high temperature calcination can be performed at a temperature of at least about 900° C.

In certain embodiments, the high temperature calcination can take place using saggars, with a calcination profile of about 16 hours at temperature. In certain embodiments, the high temperature calcination takes place for less than about 10 hours. In other embodiments, the high temperature calcination takes about 6 hours, and in further embodiments, about 3 hours. Alternatively, the high temperature calcination can take place in a rotary or pendulum type kiln. Processes in these types of furnaces typically require less than about 6 hours, and in certain embodiments, less than about 4 hours, or even less than 2 hours.

The benefits of the above described two step process include a significant reduction in overall process cost due to higher throughput. Additionally, the above described process allows for the fine tuning of product properties in terms of crystallite size through the appropriate selection of the time and temperature of each step in the process. It is believed that the process described herein likewise results in a product having greater homogeneity than a layered oxide prepared by prior art processes.

Although the process disclosed herein bears some resemblance to the process disclosed in U.S. Publication No. 2009/0289218, that process can be readily distinguished from the process described herein. In particular, the process disclosed in U.S. Publication No. 2009/0289218 is used for the preparation of spinel type Li—Mn composites according to the general formula $Li_{1+x}Mn_{2-y}M_yO_4$. A compound of this type, as well as the precursors used to prepare it, are both chemically and structurally different from the $Li(Li_aNi_xCo_yMn_z)O_2$ materials produced by the process described herein. Given the substantial differences in chemical structure and properties, a skilled artisan would not have been informed of the process disclosed herein by the disclosure of U.S. Publication No. 2009/0289218.

What is more, U.S. Pub. No. 2009/0289218 discloses that the spinel type Li—Mn composite can be prepared in a continuous furnace. Continuous furnaces are substantially different from the rotary calciner used in the process described herein. For example, continuous furnaces are typically embodied by roller hearth kilns or "pusher" type kilns. Both kilns require the use of saggars, which hold the mixture being calcined firmly in one place. The process disclosed herein, though, uses a rotary calciner during the pre-calcining step. As is described elsewhere herein, a rotary calciner induces mixing during the pre-calcining process and exposes the mixture being pre-calcined to the oxygen in the pre-calcining environment. This exposure has surprisingly been found to substantially reduce the total amount of time necessary for calcination. The use of a rotary calciner is neither taught nor suggested by U.S. Pub. No. 2009/0289218.

DEFINITIONS

As used herein, each of the following terms has the meaning associated with it in this section.

The articles "a" and "an" are used herein to refer to one or to more than one (i.e., to at least one) of the grammatical object of the article. By way of example, "an element" means one element or more than one element.

As used herein "pure oxygen" refers to a gas comprising at least about 99% or more diatomic oxygen by volume.

The term "green mixture" means of amounts of lithium source and a mixed metal precursor capable of being treated by pre-calcination and calcination steps to produce a layered oxide composition.

The phrase "enriched oxygen air" means air having an oxygen content of greater than about 21% by volume.

The term "about" means ±5% of a given numerical value.

EXAMPLES

The process for preparing the layered oxide disclosed herein is now further described with reference to the following examples. These examples are provided for the purpose of illustration only and the cathode and method for making it disclosed herein should in no way be construed as being limited to these examples but rather should be construed to encompass any and all variations which become evident as a result of the teaching provided herein.

Example 1

Pre-Calcination Process and Results

A green mixture consisting of $Li_2CO_3$ (6.248 Kg) and the mixed metal oxy-hydroxide precursor $[Ni_{0.333}Co_{0.333}Mn_{0.333}O_x(OH)_y]$ (13.565 Kg) was prepared by combining the $Li_2CO_3$ and $[Ni_{0.333}Co_{0.333}Mn_{0.333}O_x(OH)_y]$ such that a mixture having a Li to metal ratio (target) of about 1.15 was formed. The Li to metal ratio was calculated based on the total moles of Li to the total moles of transition metal, i.e. the sum of the moles of Ni, Co, and Mn. The actual mixture was analyzed to contain 5.74% Li, 14.20% Ni, 14.50% Co, and 13.60% Mn by weight. The measured Li/Me ratio was 1.12. The average oxidation state of transition metals in the green mixture determined by Bunsen titration was 2.53.

The green mixture was then subject to rotary calcination in a three zone rotary calciner having a metallic tube. Total residence time in the rotary calciner was about 1.5 to about 2.5 hours, with materials moving freely between the zones due to the rotation of the rotary calciner. The temperatures of the individual zones during calcination are shown in Table 1. Table 1 also includes the results of an analysis for Li, Ni, Co, and Mn in the resulting pre-calcined intermediate. These results show that the absolute concentration of Li, Ni, Co, and Mn increased with the temperature of the pre-calcination process. This was expected as $CO_2$ and $H_2O$ were driven out of the green mixture, resulting in a Li and transition metal enriched intermediate. Analysis of the pre-calcined intermediate also showed that the Li/Me ratio was about constant and that Li was not lost due to corrosion of the metallic rotary calciner tube. There was no measureable increase of impurities from the tube such as Fe, Cr, Cu and Zn found in the pre-calcined intermediates.

Table 1 further shows that the average transition metal oxidation state after pre-calcination, measured according to the previously provided procedure, was greater than about 2.85. This indicates a significant degree of oxidation of the transition metals, with fully formed layered oxide material having an oxidation state of about 3.

TABLE 1

| Sample | Zone 1 (° C.) | Zone 2 (° C.) | Zone 3 (° C.) | Li (wt. %) | Ni (wt. %) | Co (wt. %) | Mn (wt. %) | Li/Me* | Avg. Ox. State |
|---|---|---|---|---|---|---|---|---|---|
| A | 200 | 350 | 350 | 5.85 | 15.00 | 15.40 | 14.20 | 1.09 | 2.89 |
| B | 250 | 350 | 450 | 6.45 | 16.10 | 16.30 | 15.20 | 1.12 | 2.86 |
| C | 250 | 450 | 450 | 6.88 | 16.80 | 17.20 | 15.90 | 1.14 | 2.91 |
| D | 300 | 500 | 500 | 7.28 | 18.00 | 18.30 | 17.00 | 1.13 | 2.93 |
| E | 325 | 550 | 550 | 7.67 | 18.50 | 19.20 | 17.80 | 1.15 | 2.95 |
| F | 325 | 580 | 580 | 7.66 | 18.60 | 19.20 | 18.00 | 1.14 | 2.95 |

*= molar ratio; Me = Ni + Co + Mn

Example 2

High Temperature Calcination in a Box Type Furnace

Figure 3:
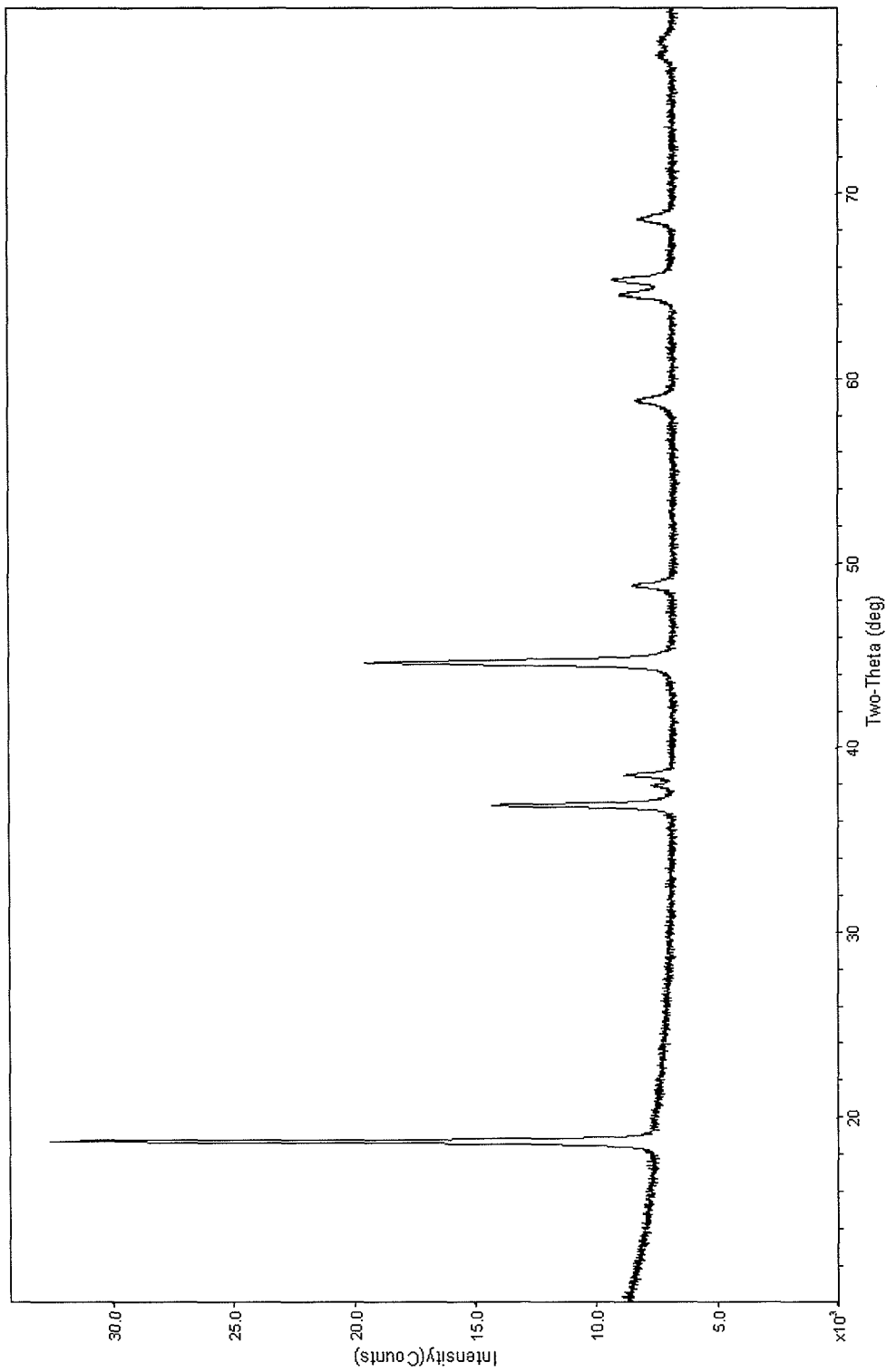
FIG. 3 is a powder x-ray diffraction pattern of the final product obtained after 580° C. pre-calcination followed by 1 hr high temperature calcination at 900° C. in a box type furnace.

The materials produced in the pre-calcination process were then subject to high temperature calcination in a box type furnace according to the conditions set forth in Table 2, in air. An exemplary powder XRD of the resulting final material is shown in FIG. 3. The resulting materials were analyzed to have the Li, Ni, Co, and Mn contents shown in a given row. Li to metal ratios were likewise calculated for the final product. Loss on ignition ("LOI") was also calculated. LOI (weight %) was determined by weighing a sample, heating the sample to 800° C., and weighing the sample again. Any observed weight loss provided an approximation of the amount of free lithium carbonate and/or hydroxide in the high temperature calcined material.

TABLE 2

| Feed | Target temp. (° C.) | Ramp (h) | Dwell (h) | Li (wt. %) | Ni (wt. %) | Co (wt. %) | Mn (wt. %) | Li/Me* | LOI (%) |
|---|---|---|---|---|---|---|---|---|---|
| E | 950 | 2 | 4 | 7.68 | 19.90 | 20.40 | 18.80 | 1.08 | 0.42 |
| F | 950 | 2 | 2 | 7.78 | 19.80 | 20.40 | 19.00 | 1.09 | 0.38 |
| G | 900 | 2 | 2 | 7.79 | 19.60 | 20.30 | 18.50 | 1.11 | 0.4 |
| H | 900 | 2 | 1 | 7.90 | 20.00 | 20.40 | 18.80 | 1.11 | 0.48 |
| I | 900 | 2 | 4 | 7.89 | 19.90 | 20.37 | 18.56 | 1.11 | 0.35 |
| J | 900 | 2 | 2 | 7.72 | 19.60 | 20.00 | 18.40 | 1.10 | 0.44 |
| K | 900 | 2 | 1 | 7.85 | 19.90 | 20.30 | 18.69 | 1.11 | 0.49 |
| L | 900 | 2 | 4 | 7.93 | 20.20 | 20.50 | 18.90 | 1.10 | 0.42 |

*= molar ratio; Me = Ni + Co + Mn

Example 3

High Temperature Calcination in a Rotary Calciner

A green mixture was prepared according to the procedure set forth in Example 1. This mixture was then pre-calcined at 625° C. in flowing air atmosphere. The resulting pre-calcined intermediate was then immediately subjected to a three-zone high temperature calcination in a rotary calciner having a flowing air environment. Calciner temperature zone settings are set forth in Table 3.

TABLE 3

| Zone | Temperature (° C.) |
|---|---|
| 1 | 700 |
| 2 | 910 |
| 3 | 910 |

Figure 4:
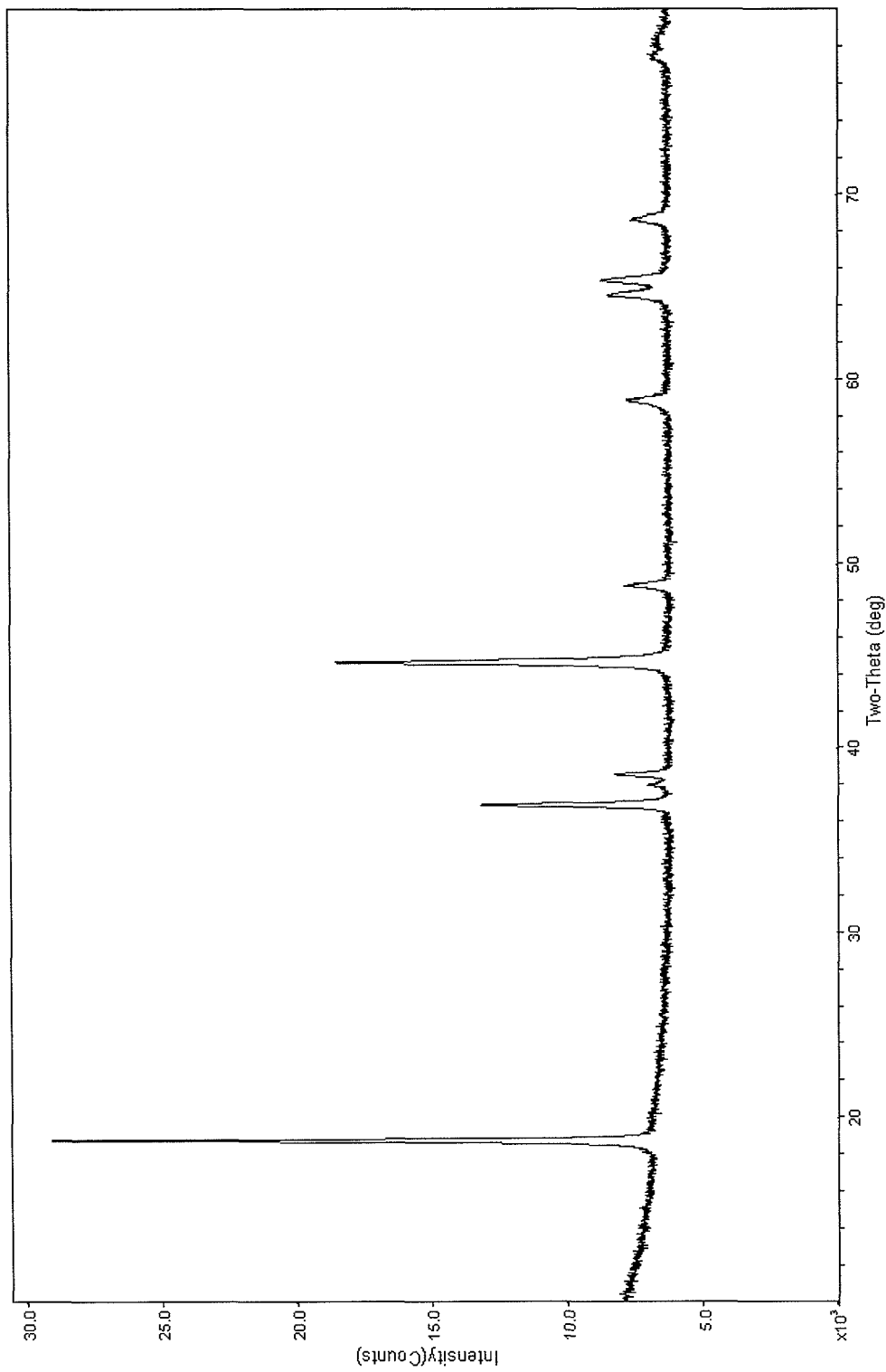
FIG. 4 is a powder x-ray diffraction pattern of the final product obtained after a 625° C. rotary pre-calcination followed by high temperature calcination at 910° C., also in a rotary calciner.

The overall residence time of the pre-calcined intermediate in the high temperature rotary calciner was about 1 hr. The resulting final layered oxide product of this process was a highly crystalline material identical in structure to materials produced according to the standard methodology. See, for example, FIG. 4.

The resulting product was also analyzed to determine the level of impurities contained therein. Two types of samples were used to determine the quantity of impurities. Sample A was taken from the material collected during first about 15 minutes of the product discharge from the calciner. Sample B was then taken from the bulk of the material collected during the rest of the high-temperature rotary calcination process.

TABLE 4

| Material | Li (wt. %) | Ni (wt. %) | Co (wt. %) | Mn (wt. %) | Li/Me* | Cr (ppm) | Fe (ppm) |
|---|---|---|---|---|---|---|---|
| Sample A | 8.07 | 19.90 | 20.30 | 18.90 | 1.13 | 26 | 31 |
| Sample B | 7.95 | 20.30 | 20.60 | 18.60 | 1.11 | <10 | <10 |

*= molar ratio; Me = Ni + Co + Mn

Both the Sample A and the Sample B showed Li/Me ratios consistent with the intermediate compositions and thus no loss of lithium in the tube. Fe and Cr impurities, however, varied between the Sample A and B. Specifically, the Sample A contained slightly elevated quantities of Fe and Cr at 31 ppm and 26 ppm, respectively. Conversely, the Sample B showed no measureable increases in Fe and Cr versus samples subject to high temperature calcination in non-rotary type calciners.

Without wishing to be bound to any particular theory, it is believed that the difference in Fe and Cr concentration in Sample A and Sample B is due to the formation of an initial sacrificial coating in the tube of the rotary calciner in the beginning of the process. As this coating forms, subsequent materials are not directly exposed to the metallic tube and thus do not contain increased levels of these undesired impurities.

The disclosures of each and every patent, patent application, and publication cited herein are hereby incorporated herein by reference in their entirety.

While reference has been made to specific embodiments, it is apparent that other embodiments and variations can be devised by others skilled in the art without departing from their spirit and scope. The appended claims are intended to be construed to include all such embodiments and equivalent variations.

What is claimed is:

1. A process for preparing a layered oxide cathode composition, said process comprising:
    pre-calcining a lithium source and a mixed metal precursor in a first rotary calciner to form a pre-calcined material; and
    subjecting said pre-calcined material to high temperature calcination in a second rotary calciner at a temperature of at least about 750° C.,
    wherein the first rotary calciner has at least two zones, wherein each zone has a set temperature throughout the zone that is independent of the temperature of the other zones and wherein:
    a first zone has a first temperature ranging from about 195° C. to about 300° C., and
    a second zone has a second temperature ranging from about 340° C. to about 750° C.

2. The process of claim 1, wherein said lithium source is selected from the group consisting of lithium carbonate, lithium hydroxide, lithium oxide, lithium chloride, lithium nitrate, lithium sulfate, lithium hydrogen-carbonate, lithium acetate, lithium fluoride, lithium bromide, lithium iodide, and lithium peroxide.

3. The process of claim 1, wherein said mixed metal precursor is selected from the group consisting of mixed metal hydroxides, metal oxy-hydroxides, metal carbonates, and metal hydroxyl-carbonates.

4. The process of claim 1, wherein said second rotary calciner has at least two zones.

5. The process of claim 4, wherein each of said zones has a same or a different temperature from each other zone.

6. The process of claim 1, wherein the pre-calcination step and the high temperature calcination step each individually takes place for less than 12 hours.

7. The process of claim 6, wherein the pre-calcination step and the high temperature calcination step each individually takes place for less than 6 hours.

8. The process of claim 6, wherein the pre-calcination step and the high temperature calcination step each individually takes place for less than 2 hours.

9. The process of claim 1, wherein said high temperature calcination comprises:
    heating said pre-calcined material to a temperature of at least about 750° C. over a first period of time; and
    holding said temperature for a second period of time.

10. The process of claim 9, wherein said temperature is at least about 900° C.

11. The process of claim 9, wherein said first period of time is about 1 hour or less, and said second period of time is about 3 hours or less.

12. The process of claim 1, wherein said first and second rotary calciner each individually comprises a metallic tube or a ceramic tube.

13. The process of claim 1, wherein the pre-calcining and high-temperature calcining steps have an aggregate duration of about 15 hours or less.

14. The process of claim 1, wherein said first rotary calciner has 3 to 6 zones, wherein a third zone has a third temperature ranging from about 340° C. to about 750° C., wherein zones 2 to 6 are the same as each other or are different from each other.

15. The process of claim 1, wherein first zone has a first temperature ranging from about 195° C. to about 250° C.

16. A process for preparing a layered oxide cathode composition, said process comprising:
    pre-calcining a lithium source and a mixed metal precursor in a first rotary calciner to form a pre-calcined material; and
    subjecting said pre-calcined material to high temperature calcination in a second rotary calciner at a temperature of at least about 750° C.,
    wherein the first rotary calciner has 3 to 6 zones, wherein each zone has a set temperature throughout the zone that is independent of the temperature of the other zones and wherein:
    a first zone has a first temperature ranging from about 195° C. to about 330° C. 300° C.,
    a second zone has a second temperature ranging from about 340° C. to about 750° C., and
    a third zone has a third temperature ranging from about 340° C. to about 750° C.,
    wherein said mixed metal precursor comprises nickel, manganese, cobalt, and aluminum, in a ratio of $Ni_xMn_yCo_zAl_w$, where $x+y+z+w \leq 1$, and $0 \leq x < 1$, $0 \leq y < 1$, $0 \leq z < 1$ and $0 \leq w < 0.2$.

17. The process of claim 16, wherein first zone has a first temperature ranging from about 195° C. to about 250° C.

18. A process for preparing a layered oxide cathode composition, said process comprising:
    pre-calcining a lithium source and a mixed metal precursor in a rotary calciner to form a pre-calcined material; and
    subjecting said pre-calcined material to high temperature calcination in a box type furnace at a temperature of at least about 750° C.,
    wherein the rotary calciner has at least two zones, wherein each zone has a set temperature throughout the zone that is independent of the temperature of the other zones and wherein:
    a first zone has a first temperature ranging from about 195° C. to about 300° C., and
    a second zone has a second temperature ranging from about 340° C. to about 750° C.

19. The process of claim 18, wherein said lithium source is selected from the group consisting of lithium carbonate, lithium hydroxide, lithium chloride, lithium oxide, lithium nitrate, lithium sulfate, lithium hydrogen-carbonate, lithium acetate, lithium fluoride, lithium bromide, lithium iodide, and lithium peroxide.

20. The process of claim 19, wherein said mixed metal precursor comprises nickel, manganese, cobalt, and aluminum, in a ratio of $Ni_xMn_yCo_zAl_w$, where $x+y+z+w \leq 1$, and $0 \leq x < 1$, $0 \leq y < 1$, $0 \leq z < 1$ and $0 \leq w < 0.2$.

21. The process of claim 19, wherein said high temperature calcination comprises:
  heating said pre-calcined material to a temperature of at least about 750° C. over a first period of time; and
  holding said temperature for a second period of time.

22. The process of claim 18, wherein said mixed metal precursor is selected from the group consisting of mixed metal hydroxides, metal oxy-hydroxides, metal carbonates and metal hydroxy-carbonates.

23. The process of claim 18, wherein the pre-calcination step and the high temperature calcination step each individually takes place for less than 12 hours.

24. The process of claim 18, wherein the pre-calcination step takes place for less than 4 hours and the high temperature calcination step takes place for less than 8 hours.

25. The process of claim 18, wherein said rotary calciner has 3 to 6 zones, wherein a third zone has a third temperature ranging from about 340° C. to about 750° C., wherein zones 2 to 6 are the same as each other or are different from each other.

26. The process of claim 18, wherein first zone has a first temperature ranging from about 195° C. to about 250° C.

\* \* \* \* \*